United States Patent Office 2,862,958  
Patented Dec. 2, 1958

2,862,958
METHOD OF IMPROVING ELECTRICAL PROPERTIES OF PLASTICIZERS BY TREATMENT WITH MAGNESIUM SILICATE

Theodore N. Goreau, Hampton, S. C., assignor to Hercules Powder Company, Wilmington, Del., a corporation of Delaware No Drawing. Application October 13, 1955  
Serial No. 540,324

3 Claims. (Cl. 260—475)

The present invention relates to a process for the treatment of synthetic plasticizers to improve their electrical properties. More particularly, it relates to a process for improving the electrical properties of dialkyl esters of an acid selected from the group consisting of isophthalic and terephthalic acids.

Alkyl esters of isophthalic and terephthalic acids have been proposed as plasticizers for synthetic resins, particularly for synthetic vinyl polymers such as polyvinyl chloride. While these esters have proved to be more than satisfactory plasticizers in many respects, in some applications their electrical properties are relatively poor. Thus, for example, the volume resistivities of such plasticizers are often so low that the plasticizers are not fully acceptable for use in synthetic resins that are intended for certain electrical applications.

In the past, attempts have been made to decolorize various organic esters by contacting them with an inorganic adsorbent such as an activated clay. For the most part, these adsorbent treatments have been applied to naturally-occurring esters such as fatty acid glycerides. In other instances, treatment has been applied to synthetic esters, e. g., orthophthalic acid esters, but no improvement in electrical properties of these esters has been observed. As far as is known, the dialkyl esters of isophthalic and terephthalic acids have not been subjected to treatment of the type described herein.

It has now been found that the dialkyl esters of isophthalic and terephthalic acids can be improved significantly in their electrical properties by contacting said esters with an inorganic adsorbent. In accordance with this discovery, the invention provides a process which comprises contacting an ester of the class described above with an inorganic adsorbent for a time of at least about 1 minute.

Among the inorganic adsorbents that can be used in practicing the invention are naturally-occurring clays of the bentonite, montmorillonite and attapulgite types which have been activated by treatment with an acid or base. Synthetic inorganic adsorbents such as metallic silicates can also be used and, in fact, an outstanding adsorbent is synthetic hydrous magnesium silicate. In addition, inorganic adsorbents such as silica gel, activated alumina and silicic acid are operable. All of these are characteristically silicic, i. e., silicon-containing materials.

In order to illustrate the invention in further detail, the following examples are presented. Parts and percentages are by weight unless otherwise specified.

EXAMPLES 1 THROUGH 5

The plasticizer treated in these examples was diisooctyl isophthalate. The inorganic adsorbents which were used include "Magnesol" [a synthetic hydrous magnesium silicate ($MgO.2.5SiO_2.H_2O$) prepared in accordance with U. S. Patent No. 2,393,625 which had a free moisture content of about 10%, contained about 2% chlorides calculated as calcium chloride and possessed a particle size of 99–100% through 325 mesh], "Super Filtrol" (an acid-activated bentonite of particle size $-75+200$ mesh), activated alumina (200 mesh), silica gel (200 mesh) and Florex XXX (a calcined Florida fuller's earth having a particle size of 90% through 200 mesh).

The treatment of the plasticizer was carried out by heating the plasticizer to 135° C. and then slurrying it with a predetermined percentage of adsorbent based on the weight of plasticizer for 15 minutes. At the completion of the slurrying, there was added about 2% of diatomaceous earth (an inert filter aid) and the plasticizer and adsorbent earth were next separated by filtration. Acid numbers, hydroxyl contents, hazen colors and volume resistivities were determined before and after the treatment. The results obtained are presented below in tabular form:

Table I

| Example No. | Adsorbent | Product characteristics | | | |
|---|---|---|---|---|---|
| | | Acid No. | Percent hydroxyl | Hazen color | Volume resistivity (ohm-cm. $\times 10^{11}$) |
| 1 | "Super Filtrol" | 0.20 | Nil | 74 | 29.3 |
| 2 | Alumina | Nil | Nil | 37 | 50.5 |
| 3 | Silica gel | 0.02 | Nil | 38 | 33.2 |
| 4 | "Magnesol" | Nil | 0.06 | 47 | 81.2 |
| 5 | Florex XXX | 0.35 | 0.05 | 57 | 29.3 |

INITIAL CHARACTERISTICS OF PLASTICIZER  
Acid No. ---------------------------------------- Nil.  
Percent hydroxyl -------------------------------- Nil.  
Hazen color ------------------------------------- 52.  
Volume resistivity ------------------------------ $17.6 \times 10^{11}$ ohm-cm.

EXAMPLE 6

In additional experiments the same plasticizer was treated as above with 5% "Super Filtrol", filtered, treated with 5% "Magnesol", and then filtered again. The treated plasticizer had a volume resistivity of $29.3 \times 10^{11}$ ohm-cm. and a hazen color of 62.

EXAMPLE 7

In additional experiments diisooctyl terephthalate having an initial volume resistivity of $5.8 \times 10^{11}$ ohm-cm. was treated with 5% "Super Filtrol" at 135° C. for 10 minutes. The treated plasticizer had a volume resistivity of $20.9 \times 10^{11}$ ohm-cm. Treatment of a separate sample of plasticizer with 5% "Magnesol" for 10 minutes at 135° C. gave a product having a volume resistivity of $99 \times 10^{11}$ ohm-cm.

The data presented in the above examples show that in every instance an improvement in volume resistivity was obtained. It is further pointed out that the improvement in volume resistivity is independent of improvement in color because in some instances deterioration of color was observed and is also independent of change in acid number because in some instances an increase in acid number was noted. It is significant also that a treatment with two or more different adsorbents can be used although such treatment offers no particular advantages.

Among the adsorbents, synthetic hydrous magnesium silicate ("Magnesol") is outstanding with respect to improvement in volume resistivity, and use of this adsorbent has the further advantages that color is incidentally improved and acid number is unchanged.

EXAMPLE A

That the improvement in the plasticizers obtained by the process of the invention is not applicable generally to other plasticizers was demonstrated by the treatment of di(2-ethylhexyl) adipate and di(2-ethylhexyl) phthalate by the same manipulative procedures of Example 1. The following results were noted:

Table II

| Plasticizer | Adsorbent | Percent adsorbent | Time (min.) | Temp. (° C.) | Product characteristics | | | |
|---|---|---|---|---|---|---|---|---|
| | | | | | Acid No. | Percent hydroxyl | Hazen color | Volume resistivity (ohm-cm. $\times 10^{11}$) |
| Di(2-ethylhexyl) phthalate | "Super Filtrol" | 5 | 15 | 135 | 1.65 | 0.03 | 137 | 0.716 |
| Do | "Super Filtrol" | 5 | 15 | 135 | 3.8 | Nil | 145 | 0.20 |
| | "Magnesol" | 5 | 15 | 135 | | | | |
| Di(2-ethylhexyl) adipate | "Super Filtrol" | 5 | 15 | 135 | 0.21 | 0.07 | 100 | 2.28 |
| Do | "Super Filtrol" | 5 | 15 | 135 | 0.13 | 0.05 | 180 | 2.87 |
| | "Magnesol" | 5 | 15 | 135 | | | | |

INITIAL CHARACTERISTICS OF PLASTICIZERS

| | Di(2-ethylhexyl) phthalate | Di(2-ethylhexyl) adipate |
|---|---|---|
| Acid No | Nil | 0.03 |
| Percent hydroxyl | Nil | Nil |
| Hazen color | 67 | 67 |
| Vol. resistivity ohm-cm | $2.14 \times 10^{11}$ | $3.19 \times 10^{11}$ |

It is apparent from the above results that treatment with an inorganic adsorbent can actually detract from the electrical properties of certain esters of dicarboxylic acids and monohydric alcohols, thus demonstrating the selectivity of the invention as far as the general chemical composition of the plasticizer is concerned.

The variables which to some extent may affect the degree of improvement of the plasticizers are the amount of adsorbent and the time and temperature of treatment. Of these, temperature has been found to be the most important; the higher the temperature, within reason, the greater is the improvement in volume resistivity. While any temperature below that at which the plasticizer undergoing treatment decomposes or darkens can be used, a temperature of from about 20 to 175° C. is generally used with a temperature of from about 100 to 150° C. being preferred.

The time of contact has been found to have little effect on the results obtained. A contact time of at least about one minute is recommended to assure adequate treatment but there is no upper limit on the time of contact.

The amount of adsorbent can be varied widely, it being understood that any finite amount of adsorbent contacted for any finite amount of time will lead to some improvement. A recommended minimum is 0.1% of the weight of plasticizer while the maximum that can be used is solely a matter of economy and simplicity.

The contacting of the adsorbent and the plasticizer can be carried out by any of several manipulative procedures known to the art. The examples have illustrated contact by slurrying but other equivalent procedures, e. g., percolation, etc., can be used.

The process of the invention is applicable to any plasticizer that is essentially a dialkyl ester of isophthalic or terephthalic acid. Usually in such plasticizers the alkyl groups will each contain from about 1 to 12 carbon atoms and may be the same or different alkyl groups. Representative of such compounds are diisooctyl isophthale, di-(2-ethylhexyl) isophthalate, dibutyl isophthalate, dihexyl isophthalate, and corresponding esters of terephthalic acid.

What I claim and desire to protect by Letters Patent is:

1. The process which comprises contacting a dialkyl ester of an acid selected from the group consisting of isophthalic and terephthalic acids with a synthetic hydrous magnesium silicate in the amount of at least 0.1% by weight of said ester at a temperature from about 20 to 175° C. and for a time of at least about one minute, whereby the volume resistivity of said ester is improved thereby rendering it more useful as a plasticizer for synthetic resins.

2. The process of claim 1 in which the ester is a dialkyl isophthalate.

3. The process of claim 1 in which the ester is a dialkyl terephthalate.

References Cited in the file of this patent

UNITED STATES PATENTS

| 1,989,699 | Kyrides | Feb. 5, 1935 |
| 2,087,457 | Thomas et al. | July 20, 1937 |
| 2,776,984 | Mention et al. | Jan. 8, 1957 |

FOREIGN PATENTS

| 667,109 | Great Britain | Feb. 27, 1952 |